United States Patent Office 2,828,182
Patented Mar. 25, 1958

2,828,182

USE OF CHELATING AGENTS IN FERTILIZERS TO ENHANCE THE GROWTH OF PLANT LIFE

Nicholas D. Cheronis, Brooklyn, N. Y., and Albert Schatz, Oreland, Pa.

No Drawing. Application March 31, 1955
Serial No. 498,454

20 Claims. (Cl. 23—27)

Our invention relates to soil genesis and to the treatment of earth soils, particularly earth soils of mineral character, to improve their usefulness and to enhance the growth of plant life therein.

Many types of earth soils are substantially useless for the growth of vegetable and plant life therein, typical of such soils being those of rocky types, shales, basalts and limestone character. Such soils or potential soil materials are present in the earth's crust in huge amounts but they have heretofore been unavailable, from a practical standpoint, for the useful and economical growth of vegetable and plant life therein. Our present invention makes possible, in a simple and economic manner, the genesis, from substantially worthless source materials, of soils which are useful for the growth of vegetable and plant life and, moreover, makes feasible the improvement of other soils which already possess such utility.

The practice of our invention, hereafter described in detail, serves to increase the rate of soil genesis and soil formation from mineral, rock and soil material by artificially increasing the biological weathering of such material. By reason of the use of our invention, potash and other important mineral nutrients are conserved because the plants are enabled to utilize the already present but ordinarily unavailable supply of these materials in the soil.

We have found that the addition of small quantities of certain organic compounds, described in detail below, to earth soils and crushed rocks such as shales, basalts and limestones brings about the unusual and unexpected results such as have been referred to above and which are further described hereafter. The rock or the like is degraded, the action giving rise to coordination complexes which are soluble, the added organic compound functioning analogously to a catalyst in that a small amount thereof is cyclically able to effect changes in a large mass of rock, soil or mineral material. When small quantities of said organic compounds are added to soils around plants and vegetables such as corn, wheat, oats, rye, barley, potatoes, beets, onions, fruits, etc., grown under greenhouse or farm field conditions, highly advantageous results are achieved which manifest themselves in one or more ways such as producing more rapid growth, bringing about earlier maturity, or producing greater yields per acre.

We have also found that the addition of small quantities of organic chelating agents, described in detail below, to earth soils brings about unusual and unexpected results. When small quantities of said organic chelating agents are added to soils around plants and vegetables such as corn, wheat, oats, rye, barley, potatoes, beets, onions, melons and fruits in general, grown under greenhouse or farm field conditions, highly advantageous results are achieved which manifest themselves in one or more ways such as producing more rapid growth, bringing about earlier maturity, or producing greater yields per acre. The utilization of the organic chelating agents, in accordance with our invention, enhances or stimulates the growth of cultivated plant life by making available, and maintaining available, in a form assimilable by said plant life, such necessary elements as phosphorus and trace metals from sources both internal as well as external to the soil.

The organic chelating agents which we have found to be effective for the achievement of the results described above are, generally speaking, microbiologically stable chelating agents of the type which form water-soluble metalorganic complexes with cationic trace elements normally essential for adequate plant growth as, for example, Ca, Mg, Zn, Mn, Fe, Cu, Co, etc. By the term "microbiologically stable," we mean that the chelating agents selected must be of such character as not to be destroyed or their efficacy destroyed by the soil bacteria.

The chelating agents comprise well known groups of chemical compounds which are disclosed in a variety of patents and other publications, reference being had, for instance, to "Chemistry of the Metal Chelate Compounds" by Martell and Calvin, published by Prentice-Hall, Inc., 1952. We have found that those chelating agents which fall into the category of aminopolycarboxylates and polyhydroxypolycarboxylates, especially the former, are particularly satisfactory. The chelating agents which we have found to be particularly effective are those which are not naturally occurring and which are not readily metabolized by the microfauna and microflora in the soil.

The aminopolycarboxylates are conveniently prepared, for instance, by reacting ammonia or mono-di- or polyamines with halogeno-carboxylic acids. Typical or illustrative examples of such amines are ethylamine, n-propylamine, isopropylamine, n-butylamine, furfurylamine, isobutylamine, amylamines, hexylamines, cyclohexylamine, ethylenediamine, diethylenetriamine, triethylenetramine, tetraethylenepentamine, propylenediamine, dipropylenetriamine, mono-methyl ethylenediamine; 1,3-diamino-2-propanol; glycerolamine; 1-amino-2,3-propanediol; 1,2-diaminopropanol; 2-amino-1-butanol; beta-hydroxyisopropylamine; 2-amino-1,3-propanediol; hexamethylenediamine; hexamethylenetriamine; phenylenediamines such as p-phenylenediamine and o-phenylenediamine; triaminobenzenes, triaminotoluenes, benzylamine, aniline, diaminocresol, and benzidine. Illustrative examples of halogenocarboxylic acids which may be reacted with the ammonia or amines are monochloracetic acid, dichloracetic acid, monochlorpropionic acid, monochlorsuccinic acid, dichlorsuccinic acid, monochloradipic acid, and other halogenocarboxylic acids.

The aminopolycarboxylates which are derived from the reaction between ammonia and halogeno-monocarboxylic and halogeno-dicarboxylic acids can be represented by the general formulae

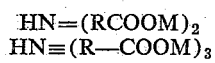

where R is an organic radical, for instance, $CH_2$; $CH_2$—$CH_2$; and $(CH_3)_2$=C; and the like, and M is hydrogen or a cation as hereafter described.

The aminopolycarboxylates which are derived from the reaction between a mono-di- or polyamine and halogeno-monocarboxylic acid or halogeno-polycarboxylic acid can be represented by the general formula

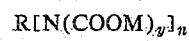

where R is an organic radical, for instance, $CH_2$; $CH_2$—$CH_2$; and $CH_2$—$CH_2$—$CH_2$—$CH_2$; M is hydrogen or a cation as hereafter described; $y$ is an integer, particularly from 2 to 6; and $n$ is an integer, particularly from 1 to 10.

We have found, also, that polyamides such as those commonly used for the production of fibers such as nylon [—NH—$(CH_2)_{n1}$—NH—CO—$(CH_2)_{n2}$—CO—], when they are partially hydrolyzed yield fragments which are useful agents in the practice of our present invention.

Illustrative examples of aminopolycarboxylates and of polyhydroxypolycarboxylates are set forth below in Tables I and II, respectively. While said compounds are shown in the form of their free acids, it is usually more advantageous to utilize them in the form of any of their salts or metal coordination complexes, including their water-soluble salts, particularly their alkali metal, ammonium and amine or ethanolamine salts as, for instance, sodium, potassium, lithium, monoethanolamine, diethanolamine and triethanolamine salts. Where reference is made to said compounds, therefore, it will be understood that the free acids and their salts or metal coordination complexes are intended to be encompassed, unless the context expressly shows otherwise.

TABLE I
*Aminopolycarboxylates*

1. $HN=(CH_2—COOH)_2$ (Prepared by reacting ammonia with monochloracetic acid)
2. $N\equiv(CH_2—COOH)_3$ (Prepared by reacting ammonia with monochloracetic acid)
3. $HN=[CH(CH_3)COOH]_2$ (Prepared by reacting ammonia with monochlorpropionic acid)
4. $N\equiv[CH(COOH)—(CH_2)_3—COOH]_3$ (Prepared by reacting ammonia with chlorohexanedicarboxylic acid)
5. $N\equiv[C(CH_3)_2—COOH]_3$ (Prepared by reacting ammonia with monochlormethylpropionic acid)
6. $CH_3—CH_2—N=[CH(COOH)—CH_2—COOH]_2$ (Prepared by reacting ethylamine with monochlorsuccinic acid)
7. $CH_3—CH_2—CH_2—N=(CH_2—COOH)_2$ (Prepared by reacting n-propylamine with monochloracetic acid)
8. $(HOOC—H_2C)_2=N—CH_2—CH_2—N=(CH_2—COOH)_2$ (Prepared by reacting ethylenediamine with monochloracetic acid)
9. $(HOOC—H_2C)_2=N—CH_2—CH(OH)—CH_2—N=(CH_2—COOH)_2$ (Prepared by reacting 1,3-diamino-2-propanol with monochloracetic acid)
10. $(HOOC—H_2C)_2=N—CH_2—(CH_2)_4—CH_2—N=(CH_2—COOH)_2$ (Prepared by reacting 1,6-diaminohexane with monochloracetic acid)
11. $(CH_2)_8[N—CH_2—COOH]_5$ (Prepared by reacting tetraethylenepentamine with monochloracetic acid)
12. $(HOOC—CHR)_2=N—CH_2—CH_2—N=(CHR—COOH)_2$ (where R is an alkyl or aryl radical as, for example, methyl, propyl, butyl, benzene, or toluene)
13. $HN=[CH(COOH)—(CH_2)_n—CH_3]_2$
14. $N\equiv[CH(COOH)—(CH_2)_n—CH_3]_3$ In Examples 13 and 14, $n$ is an integer from 2 to 16. A typical example thereof is a reaction product of α-chlorobutyric acid with ammonia, the ratio of the ammonia to the α-chlorobutyric acid being kept small so as to produce a major proportion of the secondary and tertiary amino derivatives. The mixture can be used as such without separating out the primary amino derivatives.

TABLE II
*Polyhydroxypolycarboxylates*

1. Lecanioc acid
2. Gyrophoric acids
3. Orsenylic acids
4. The Lichen acids (see Chemistry of Lichen Substances, English Translation, Maruzen & Co., Tokyo, 1954)
5. Mucic acid The soil genesis action, in accordance with the present invention, is illustrated by experiments summarized in Tables III and IV. In each case, 30 grams of various crushed rocks were allowed to stand for 10 days with small amounts of the added organic compound, the specific illustrative example of the latter which was utilized in said experiments being ethylenediamine tetracetic acid $$(HOOC—H_2C)_2=N—CH_2—CH_2—N=(CH_2—COOH)_2$$

The amount of the added organic compound varied from 0.006 to 0.2 gram or, in other words, from 0.02% to 0.6% based on the weight of the crushed rock. The measurement of pH and various chemical determinations showed clearly the degradation of the rocks.

TABLE III
*Influence of ethylenediamine tetracetic acid on pH of soil suspension*

| 30. g. soil+30.0 ml. distilled $H_2O$+said acid | pH after— | | | | |
|---|---|---|---|---|---|
| | 0.75 hr. | 4.5 hr. | 26.3 hr. | 3.1 days | 7 days |
| No said acid (control) | 5.50 | 5.44 | 5.44 | 5.45 | 5.47 |
| 0.01 said acid | 4.95 | 5.08 | 5.15 | 5.23 | 5.35 |
| 0.025 said acid | 4.52 | 4.70 | 4.79 | 4.83 | 4.96 |
| 0.05 said acid | 3.99 | 4.21 | 4.44 | 4.49 | 4.63 |
| 0.1 said acid | 3.41 | 3.72 | 3.97 | 4.10 | 4.23 |
| 0.25 said acid | 3.16 | 3.14 | 3.37 | 3.55 | 3.78 |
| 0.5 said acid | 3.15 | 2.90 | 2.84 | 2.94 | 3.23 |
| 0.75 said acid | 3.10 | 2.90 | 2.75 | 2.71 | 2.68 |
| 1.0 said acid | 3.08 | 2.93 | 2.82 | 2.62 | 2.65 |
| 2.0 said acid | 3.02 | 2.85 | 2.72 | 2.64 | 2.54 |
| 3.0 said acid | 2.96 | 2.86 | 2.75 | 2.65 | 2.53 |
| 4.0 said acid | 2.87 | 2.85 | 2.74 | 2.58 | 2.54 |
| 5.0 said acid | 2.80 | 2.85 | 2.75 | 2.64 | 2.55 |

TABLE IV
*Influence of ethylenediamine tetracetic acid on crushed rock in distilled water*

| g. of said acid+ distilled water to 30.0 ml. final volume | No rock (control) | | Crushed Basalt | | Crushed Limestone | | Crushed Red Shale |
|---|---|---|---|---|---|---|---|
| | pH after days | | | | | | |
| | 8 days | 23 days | 10 days | 20 days | 10 days | 10 days | 20 days |
| 0 | 5.80 | 5.81 | 8.17 | 8.34 | 7.90 | 8.06 | 7.99 |
| 0.0001 | 5.40 | 5.25 | 8.17 | 8.19 | 7.91 | 8.05 | 7.99 |
| 0.0003 | 4.12 | 4.15 | 8.15 | 8.21 | 7.95 | 7.96 | 7.99 |
| 0.001 | 3.68 | 3.71 | 8.16 | 8.16 | 7.96 | 8.00 | 7.97 |
| 0.003 | 3.17 | 3.21 | 8.13 | 8.16 | 8.00 | 7.90 | 7.91 |
| 0.01 | 2.78 | 2.82 | 8.04 | 8.22 | 7.95 | 7.84 | 7.86 |
| 0.03 | 2.77 | 2.82 | 7.90 | 8.22 | 7.87 | 7.67 | 7.76 |
| 0.06 | 2.76 | 2.80 | 7.58 | 7.82 | 7.87 | 7.12 | 7.30 |
| 0.1 | 2.71 | 2.76 | 7.22 | 7.51 | 7.94 | 6.43 | 6.64 |
| 0.3 | 2.69 | 2.73 | 6.28 | 6.69 | 7.93 | 4.11 | 4.39 |
| 0.5 | 2.71 | 2.74 | | | 7.88 | 3.84 | 4.11 |
| 0.75 | 2.67 | 2.68 | 4.60 | 4.84 | 7.86 | 3.23 | 3.24 |
| 1.0 | 2.61 | 2.68 | 4.12 | 4.36 | 7.85 | 3.06 | 3.12 |
| 2.0 | 2.65 | 2.70 | 3.40 | 3.68 | 7.90 | 3.16 | 3.19 |
| 3.0 | 2.51 | 2.56 | 2.85 | 3.35 | 7.98 | 3.22 | 3.22 |

With respect to Table III, it will be seen that the pH of the soil suspensions remained more or less constant (average pH about 5.48) in the absence of the organic acid. During the first 45 minutes, the pH exhibited a decrease the magnitude of which decrease varied directly with increasing concentrations of the organic acid. After the initial 45 minute period the pH increased steadily in the presence of 0.01 to 0.25 g. of said organic acid.

Where 0.5 g. of said organic acid was used, the pH decreased until one day had elapsed and thereafter the pH increased. With the use of 0.75 to 5.0 g. of said organic acid, the pH decreased continuously. The supernatant liquid became progressively browner in color with increasing concentration of said organic acid.

With respect to Table IV, in the control, where no crushed rock was present, the organic acid was not fully dissolved. In the presence of 0.06 to 3 g. of said organic acid, in the case of the basalt, the supernatant liquid became increasingly browner in color with increasing concentrations of said organic acid. In the case of the red shale, the same observation was made. In the case of the limestone, carbon dioxide gas evolved vigorously at the higher concentrations of said organic acid and the supernatant liquid turned reddish brown almost immediately. On the 10th day, the limestone, in the presence of 3.0 g. of said organic acid, had formed a solid, concreted mass which was difficult to chip out of the container.

While the chelating agents can be used alone, as addition agents to the soil, we find it especially desirable to utilize the same in conjunction, and most advantageously in admixture, with a fertilizer material, providing advantageously nitrogen, phosphorus and potassium, and an agricultural lime or other inorganic materials such as superphosphate, rock phosphate, gypsum, bone meal, and the like. In such cases, the chelating agent may comprise from about 0.1% to about 15%, by weight, of the fertilizer material. The effect of the conjoint use of the chelating agents and said fertilizer material or materials, when present together in the soil, is to bring about a very sharp and wholly unexpected increase in growth, rate of growth, and yield when measured against the utilization of the chelating agent alone or the use of the fertilizer or fertilizers alone. A good range of ratios of chelating agent to fertilizer (10—10—10 NPK) is 1 part of the chelating agent to from 10 to 20 parts of fertilizer, and where agricultural lime is also used it may comprise from 2 to 6 parts, depending, of course, upon the lime content of the soil. The fertilizer material may and advantageously does include trace elements such as B, Cu, Mn, Co, Ni, Mo, Zn, Fe, and the like. In large scale application, the chelating agent may be admixed with the fertilizer, agricultural lime, where used, and trace elements, and then drilled in by the conventional planter.

The significance of our invention, in practical plant growth, is illustrated by the following field experiments:

A 20 x 166-foot plot of ground was plowed and planted with a total of 9 rows containing 419 hills of corn. Between the 18th and 22nd days thereafter, all hills were thinned to 3 stalks per hill and were divided and treated as follows:

TABLE V

| Lot | Rows | Hills Total | Treatment |
|---|---|---|---|
| 1 | 1, 2 | 93 | 4.5 grams of the ammonium salt of ethylenediamine tetracetic acid per hill; no agricultural lime. |
| 2 | 3, 4 | 100 | Same as Lot 1 plus agricultural lime and trace elements (B, Cu, Mn). |
| 3 | 5, 6 | 100 | Same as Lot 2 but no trace elements. |
| 4 | 7, 8, 9 | 126 | Agricultural lime plus $NH_4NO_3$ in amounts such that the content of assimilable nitrogen thereof is equivalent to that present in the 4.5 grams of the ammonium salt of ethylenediamine tetracetic acid. |

The aforesaid aminopolycarboxylate was used in a 20% aqueous solution and the pH adjusted to between 6 and 7, then added around each hill at a distance of 4 to 6 inches from the plants.

The treatment was repeated 6 days later, the amount of said aminopolycarboxylate added being 4.8 grams per hill. Twenty-six days later, 9 grams per hill was added.

In each case the hills in Lot 4 (controls) received the equivalent amount of nitrogen in the form of $NH_4NO_3$.

The rate of growth was observed by measurements. Thirty-five days after the planting, the plants in rows 1, 2, 3, 4, 5, and 6 had an average height of 13.5 inches with 19 inches maximum and 8 minimum. The foliage was dark green. The plants in rows 7, 8 and 9 had an average height of 10 inches, a maximum of 14 inches and a minimum of 8 inches. The foliage was yellow-green. Sixty-one days after the planting, the height of the plants in Lots 1, 2 and 3 was 69 inches average with 75 inches maximum, while in Lot 4 (rows 7, 8, 9) the height was 47 inches average and 55 inches maximum.

The appearance of tassels and ears in rows 3 and 4 occurred about two weeks earlier than in rows 7 and 8. The corn was harvested, shelled and weighed 161 days after the original planting. The following table summarizes the yields:

TABLE VI

| Lot | Rows | Hills Number | Plants | Total Yield of Corn, lbs. | Yield per 100 Hills | Difference in Yield of Corn with Control, lbs./100 Hills |
|---|---|---|---|---|---|---|
| 1 | 1, 2 | 93 | 279 | 168 | 174 | 11 |
| 2 | 3, 4 | 100 | 300 | 190 | 190 | 27 |
| 3 | 5, 6 | 100 | 300 | 180 | 180 | 17 |
| 4 | 7, 8, 9 | 126 | 378 | 206 | 163 | |

The following field experiments show, further, the significance of our invention:

A series of plots of land in which the soil was very low in phosphorus, potash and nitrogen and having very little organic matter present was planted by standard methods using "Pioneer 352" corn seed, said planting having been carried out over the period June 7 to June 10. The fertilizer, where used, was agricultural lime. Three types of chelating agents were used, namely, (1) ethylenediamine tetracetic acid having a pH of about 3, (2) a substantially neutral ammonium salt of ethylenediamine tetracetic acid having a pH of 6 to 7, and (3) an alkaline sodium salt of ethylenediamine tetracetic acid having a pH of 10 to 11. Said chelating agents were all solid materials and were mixed with the agricultural lime for application as such, and with the agricultural lime and fertilizer where the chelating agent was used conjointly with fertilizer. The particular fertilizer used was of the type (N—P—K 10—10—10) but, of course, other fertilizers can be used in place thereof or in admixture therewith. The chelating agent-agricultural lime mixture and the chelating agent-agricultural lime-fertilizer mixture were applied by regular drifting procedures. The fertilizer was used in the amount of ½ oz./hill, the agricultural lime in the amount of 9 grams/hill, and the chelating agent in the amount of 4 to 5 grams/hill. Four seeds were drilled per hill. The plants were thinned to 3 per hill and later to the number indicated in the following table so as to leave an approximate population of 17,000/acre. The plots were observed once per week from June 15 to September 15, and were harvested on October 27. By the end of July, measurements in height showed that the control plants were the lowest, those wherein chelating agent plus fertilizer was utilized were highest, and those wherein chelating agent only was utilized were intermediate. With respect to depth of color (yellow green, green and blue green), those wherein chelating agent was utilized had the blue green color in every case. A drought occurred during the month of August which, of course, adversely affected growth and yield but all of the plots were exposed to the same conditions. Moreover, because the planting was late, many ears failed to mature.

TABLE VII

*Yield of corn on each experimental plot*

| Plot No. | Area, Sq. Ft. | Treatment [a] | Number of Mature Plants | Wt. of Green Corn, lbs. | Wt. of Shelled Corn, lbs. | Moisture, percent | Yield/acre, Bushels [b] |
|---|---|---|---|---|---|---|---|
| A | 4,850 | Control | 1,818 | 182.5 | 121 | 11 | 18.6 |
| B | 2,380 | Chelator | 913 | 33.5 | 59 | 9.5 | 19.0 |
| C | 3,700 | Fertilizer, ¼ oz./bu | 1,108 | 92.5 | 66 | 9.9 | 20.1 |
| D | 4,850 | Control | 743 | 130.5 | 93 | 10.1 | 18.8 |
| E | 4,850 | Chelator-Alk | ------ | 243.0 | 168 | 9.5 | 26.0 |
| F | 4,850 | Control | 1,769 | 113 | 84 | 9.4 | 13.1 |
| G | 4,850 | Chelator Neutral | 1,743 | 182.5 | 125 | 9.3 | 19.7 |
| H | 4,850 | Chel. Neut.+Fert., ½ oz./hill | 2,381 | 356 | 254 | 7.6 | 39.4 |
| I | 4,850 | Fert. only, ½ oz./hill | 2,368 | 229 | 155 | 9.8 | 24.4 |
| J | 4,850 | ----do---- | 2,376 | 261 | 195 | 11 | 30.0 |
| K | 4,850 | Chel. Alk.+Fert., ½ oz./hill | 2,379 | 318 | 232 | 9.7 | 36.0 |
| L | 4,850 | Chel. Acid+Fert., ½ oz./hill | 1,651 | 242 | 212 | 10.1 | 33.0 |
| M | 4,850 | Fertilizer only, ½ oz./hill | 2,381 | 264 | 188 | 10.1 | 29.2 |

[a] Chelator at the rate of 4–5 grams/hill (or ⅙ of one ounce); Fertilizer 10-10-10.
[b] The yield is figured on a uniform basis of corn with 10% moisture.

Table VIII gives a summary of all data for the yield of corn in bushels per acre.

TABLE VIII

*Summary of data on yield of corn—bushels per acre for related plots*

|  | Control |  | Chelator Only |  | Fertilizer Only |  | Fertilizer and Chelator |
|---|---|---|---|---|---|---|---|
| Plot A | 18.6 | Acid | 19.0 | I | 24.4 | Acid | 33 |
| Plot D | 18.8 | Alk | 26.0 | J | 30.0 | Alk | 36 |
| Plot F | 13.1 | Neutr | 19.7 | M | 20.2 | Neutr | 39 |
| Average of Sillated Plots | 17.0 |  | 22.6 |  | 28.0 |  | 36.0 |

As indicated above, the nature of the original soil and the weather conditions under which the experiments of Tables VII and VIII were performed are reflected in the low yields, the control averaging only 17 bushels/acre. Where fertilizer in the amount of ¼ oz./hill was used, the yield increased to about 20 bushels/acre; and where the fertilizer was increased to ½ oz./hill, the yield increased to 28 bushels/acre. Where chelating agent was used without fertilizer, the yield was 22.6 bushels/acre. However, where the chelating agent and fertilizer were used conjointly, the yield rose sharply to 36 bushels/acre. Of the acid, neutral and alkaline chelating agents, the neutral was the most effective. In the light of the foregoing, it will be seen that the utilization of the chelating agent in conjunction with fertilizer represents an especially important aspect of our invention, a synergistic-like effect taking place.

We are unable definitely to account for the mechanism of the reactions which take place as a result of which we obtain the significant results which have been described herein and, therefore, we refrain from expressing any views thereon.

The proportions of chelating agent are somewhat variable depending, among other things, on the particular one or ones utilized, the particular plants being grown, and the exact nature of the soil involved. In the case of corn, for instance, a good range is from about 0.5 to 2 grams per plant, and more specifically from about 1 to 1.5 grams per plant. When planted in hills of three, the amount of chelator per hill will, therefore, range from 1.5 to 6 grams.

Supplemental applications of fertilizer and other usual techniques can, of course, be employed in the growing stages. Thus, for instance, in the growing of corn, side dressing may be employed as, for example, by opening a small ditch about 4 to 6 inches deep and a foot from the plant and applying ammonium nitrate at the rate of say 160 pounds to the acre. The chelating agent can be applied in this manner. Again, the chelating agent can be applied in the form of or in admixture with a folial spray as, for example, an aqueous solution of ammonium nitrate buffered at pH 7, the chelating agent in the form of the ammonium salt of ethylenediamine tetracetic acid being used in the proportion of 4 to 5 ounces for every 2 pounds of nitrogen, said folial spray being applied by conventional equipment at the rate of 0.01 gram 2 pounds of nitrogen per acre. A part of the chelating agent may, if desired, be applied at the time of planting and the balance later applied during the growing stage, or all may be applied at the time of planting, or all may be applied at an early stage after planting. We find it most advantageous, in general, to utilize the chelating agent at the time of the planting.

The term "plant life," as used in the claims, is intended to encompass the growth of vegetables, fruits, grains, trees and grasses and such plants as are commonly grown in the earth for economic and other purposes.

This application is a continuation-in-part of our application Serial No. 321,734, filed November 20, 1952.

What we claim as new and desire to protect by Letters Patent of the United States is:

1. In a method of enhancing the growth of plant life in earth soils, the step which comprises adding to the soil in which the plant life is grown a small amount of a microbiologically stable organic chelating agent.

2. In a method of enhancing the growth of cereal grains, the step which comprises adding to the earth soil in which the cereal grains are grown a small amount of a microbiologically stable organic chelating agent.

3. In a method of enhancing the growth of plant life in earth soils, the step which comprises adding to the soil in which the plant life is grown a small amount of a microbiologically stable water-soluble organic chelating agent in admixture with commercial fertilizer.

4. In a method of enhancing the growth of cereal grains, the step which comprises adding to the earth soil in which the cereal grains are grown a small amount of a microbiologically stable water-soluble organic chelating agent in admixture with commercial fertilizer.

5. In a method of enhancing the growth of plant life in earth soils, the step which comprises adding to the soil in which the plant life is grown a small amount of a microbiologically stable aminopolycarboxylate chelating agent.

6. In a method of enhancing the growth of cereal grains, the step which comprises adding to the earth soil in which the cereal grains are grown a small amount of a microbiologically stable polyaminopolycarboxylate chelating agent.

7. In a method of enhancing the growth of plant life in earth soils, the step which comprises adding to the soil in which the plant life is grown a small amount of a microbiologically stable polyaminopolycarboxylate chelating agent in admixture with agricultural lime.

8. In a method of enhancing the growth of corn, the step which comprises adding to the earth soil in which the corn is grown a small amount of a microbiologically stable polyaminopolycarboxylate chelating agent in admixture with agricultural lime.

9. In a method of enhancing the growth of plant life in earth soils, the step which comprises adding to the soil in which the plant life is grown a small amount of a microbiologically stable organic chelating agent corresponding to the formula $$HN=(R-COOM)_2$$

where R is an organic radical, and M is a cation of the class consisting of alkali metal, ammonium and amines.

10. In a method of enhancing the growth of vegetables, the step which comprises adding to the earth soil in which the vegetables are grown a small amount of a microbiologically stable organic chelating agent.

11. In a method of enhancing the growth of plant life in earth soils, the step which comprises adding to the soil in which the plant life is grown a small amount of a microbiologically stable organic chelating agent corresponding to the formula $$(MOOC-H_2C)_2=N-CH_2-CH_2-N=(CH_2-COOM)_2$$

where M is a cation selected from the group consisting of alkali metal, ammonium and amines.

12. In a method of enhancing the growth of plant life, the step which comprises adding to the earth soil in which the plant life is grown a small amount of a microbiologically stable polyhydroxypolycarboxylate chelating agent.

13. In a method of enhancing the growth of cereal grains, the step which comprises adding to the soil in which the cereal grains are grown, in admixture with commercial fertilizer, a small amount of a microbiologically stable organic chelating agent corresponding to the formula $$(MOOC-H_2C)_2=N-CH_2-CH_2-N=(CH_2-COOM)_2$$

where M is a cation selected from the group consisting of alkali metal, ammonium and amines.

14. In a method of enhancing the growth of vegetables, the step which comprises adding to the soil in which the vegetables are grown, in admixture with commercial fertilizer, a small amount of a microbiologically stable organic chelating agent corresponding to the formula $$(MOOC-H_2C)_2=N-CH_2-CH_2-N=(CH_2-COOM)_2$$

where M is a cation selected from the group consisting of alkali metal, ammonium and amines.

15. In the genesis of soil from crushed rocks such as shales, basalts and limestones to enhance the growth of plant life therein, the step which comprises adding to said crushed rocks a small amount of a water-soluble aminopolycarboxylate.

16. In the genesis of soil from crushed rocks such as shales, basalts and limestones, the step which comprises adding to said crushed rocks, in the presence of water, a small amount of a water-soluble polyaminopolycarboxylate.

17. In the genesis of soil from crushed rocks such as shales, basalts, and limestones to enhance the growth of plant life therein, the step which comprises adding to said crushed rocks a small amount of a water-soluble chemical compound corresponding to the formula $$HN=(R-COOM)_2$$

where R is an organic radical, and M is a member selected from the group consisting of hydrogen, metals, ammonium and amines.

18. In the genesis of soil from crushed rocks such as shales, basalts and limestones to enhance the growth of plant life therein, the step which comprises adding to said crushed rocks a small amount of a water-soluble chemical compound corresponding to the formula $$N\equiv(R-COOM)_3$$

where R is an organic radical, M is a member selected from the group consisting of hydrogen, metals, ammonium and amines.

19. In the genesis of soil from crushed rocks such as shales, basalts and limestones to enhance the growth of plant life therein, the step which comprises adding to said crushed rocks a small amount of a water-soluble chemical compound corresponding to the formula $$R[N(COOM)_y]_n$$

where R is an organic radical, and M is a member se- from the group consisting of hydrogen, metals, ammonium and amines, y is an integer from 2 to 6, and n is an integer from 1 to 10.

20. In the genesis of soil from crushed rocks such as shales, basalts an limestones to enhance the growth of plant life therein, the step which comprises adding to said crushed rocks a small amount of a chemical compound corresponding to the formula $$(H_4NOOC-H_2C)_2=N-CH_2-CH_2-N=(CH_2-COONH_4)_2$$

References Cited in the file of this patent

Versene: The Modern Chelating Agent, Tech. Bulletin No. 1 copyright 1949, page 5.

Citrus Magazine, "Iron Chlorosis . . . Its Possible Causes and Control," I. Stewart et al., June 1952, pages 22–25.

Agricultural Chemicals, "Control of Iron Chlorosis," C. D. Alexander et al., July 1952, pages 36–38.

Chemistry of the Metal Chelate Compounds, Martell et al., published August 22, 1952, pages 478, 510–513.

Plant Physiology, "Maintenance of Iron . . . Tetra-Acetate," by Louis Jacobson, published April 1951, pages 411 to 413.

Notice of Adverse Decision in Interference

In Interference No. 92,364 involving Patent No. 2,828,182, N. D. Cheronis and A. Schatz, Use of chelating agents in fertilizers to enhance the growth of plant life, final judgment adverse to the patentees was rendered Jan. 3, 1963, as to claim 14.

[*Official Gazette February 5, 1963.*]